(12) United States Patent
Kawamura et al.

(10) Patent No.: US 9,679,533 B2
(45) Date of Patent: Jun. 13, 2017

(54) ILLUMINATION APPARATUS WITH IMAGE PROJECTION

(71) Applicant: PANASONIC INTELLECTUAL PROPERTY MANAGEMENT CO., LTD., Osaka (JP)

(72) Inventors: Ryo Kawamura, Osaka (JP); Kentaro Yamauchi, Osaka (JP); Atsushi Motoya, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/528,329

(22) Filed: Oct. 30, 2014

(65) Prior Publication Data

US 2015/0123946 A1 May 7, 2015

(30) Foreign Application Priority Data

Nov. 5, 2013 (JP) ................. 2013-229739

(51) Int. Cl.
| | | |
|---|---|---|
| G06F 3/042 | (2006.01) | |
| G09G 5/10 | (2006.01) | |
| G03B 21/20 | (2006.01) | |
| G09G 5/02 | (2006.01) | |
| G03B 21/26 | (2006.01) | |

(52) U.S. Cl.
CPC ............ *G09G 5/10* (2013.01); *G03B 21/206* (2013.01); *G03B 21/2053* (2013.01); *G03B 21/26* (2013.01); *G06F 3/042* (2013.01); *G09G 5/02* (2013.01)

(58) Field of Classification Search
None
See application file for complete search history.

(56) References Cited

U.S. PATENT DOCUMENTS

| | | | |
|---|---|---|---|
| 8,899,760 B2 | 12/2014 | Kawamura | |
| 2002/0016541 A1* | 2/2002 | Glossop | ................. A61B 19/20 600/407 |
| 2002/0153472 A1* | 10/2002 | Yano | ........................ H04N 9/73 250/208.1 |
| 2004/0008288 A1* | 1/2004 | Pate | ..................... G02B 26/008 348/742 |
| 2005/0195587 A1* | 9/2005 | Moctezuma De La Barrera ...... A61B 19/5202 362/5 |

(Continued)

FOREIGN PATENT DOCUMENTS

| | | | | |
|---|---|---|---|---|
| JP | 2007-041152 A | 2/2007 | | |
| JP | 2009-225432 A | 10/2009 | | |
| WO | WO 2013019190 A1 * | 2/2013 | ........... | G06T 19/006 |

*Primary Examiner* — Ilana Spar
*Assistant Examiner* — Kirk Hermann
(74) *Attorney, Agent, or Firm* — Greenblum & Bernstein, P.L.C.

(57) ABSTRACT

An illumination apparatus includes: an illumination light setter which sets illumination light for illuminating an illumination area which includes at least one of a space or an object; an image light setter which sets image light for projecting a projection image which includes at least one of a graphic or a character; and a light projector which emits the illumination light set by the illumination light setter, and projects the image light set by the image light setter.

3 Claims, 15 Drawing Sheets

(56) References Cited

U.S. PATENT DOCUMENTS

| | | | | |
|---|---|---|---|---|
| 2007/0258243 | A1* | 11/2007 | Segall | A61B 90/30 362/276 |
| 2008/0258590 | A1* | 10/2008 | Van De Sluis | A47F 3/001 312/237 |
| 2009/0033874 | A1* | 2/2009 | Aufranc | G03B 37/04 353/30 |
| 2010/0060726 | A1* | 3/2010 | Kryger Nielsen | H05B 37/029 348/65 |
| 2010/0166323 | A1* | 7/2010 | Zhao | G06T 7/0028 382/218 |
| 2010/0225748 | A1* | 9/2010 | Kawamura | G03B 15/02 348/51 |
| 2010/0277333 | A1* | 11/2010 | Van De Sluis | H05B 37/0227 340/686.1 |
| 2010/0315825 | A1 | 12/2010 | Kawamura | |
| 2011/0298807 | A1* | 12/2011 | Kim | G06T 11/203 345/442 |
| 2012/0274745 | A1* | 11/2012 | Russell | H04N 13/025 348/46 |
| 2013/0257751 | A1* | 10/2013 | Stafford | G06F 3/0488 345/173 |

* cited by examiner

ILLUMINATION APPARATUS WITH IMAGE PROJECTION

BACKGROUND OF THE INVENTION

1. Field of the Invention

The present disclosure relates to illumination apparatuses which illuminate spaces and/or objects.

2. Description of the Related Art

An example of an illumination apparatus which irradiates, for instance, a display object with illumination light is a projector that is used as an illuminator. For example, Japanese Patent No. 4341723 discloses an illuminator which can emit illumination light according to a three-dimensional shape of an object, in order to produce atmospheric effects.

SUMMARY OF THE INVENTION

An illumination apparatus according to an aspect of the present disclosure includes: an illumination light setter; an image light setter; and a light projector. The illumination light setter sets illumination light for illuminating an illumination area which includes at least one of a space or an object. An image light setter sets image light for projecting a projection image which includes at least one of a graphic or a character, the image light being different from the illumination light in at least one of luminance or color. A light projector emits the illumination light set by the illumination light setter, and projects the image light set by the image light setter onto the illumination area that is irradiated with the illumination light.

The above configuration improves an atmospheric-effect producing function of an illumination apparatus.

DETAILED DESCRIPTION OF THE PREFERRED EMBODIMENTS

There is a demand for an illumination apparatus to be applicable to various usages in order to improve an atmospheric-effect producing function. For example, it is conceivable to display guide lines for specific work when the work is performed. For example, Japanese Patent No. 4826163 discloses a projection apparatus which projects grid lines on a floor.

If grid lines are provided merely using a projection apparatus while an illumination apparatus is emitting illumination light, the grid lines may not appear and thus may not be seen in the illumination light. Furthermore, a space and an object cannot be illuminated brightly enough according to such a related technique.

The following specifically describes exemplary embodiments, with reference to the drawings.

The exemplary embodiments described below each show a general or specific example. The numerical values, shapes, materials, constituent elements, the arrangement and connection of the constituent elements, steps, the processing order of the steps, and the like described in the following embodiments are mere examples, and thus are not intended to limit the present disclosure.

First Exemplary Embodiment

Figure 1:
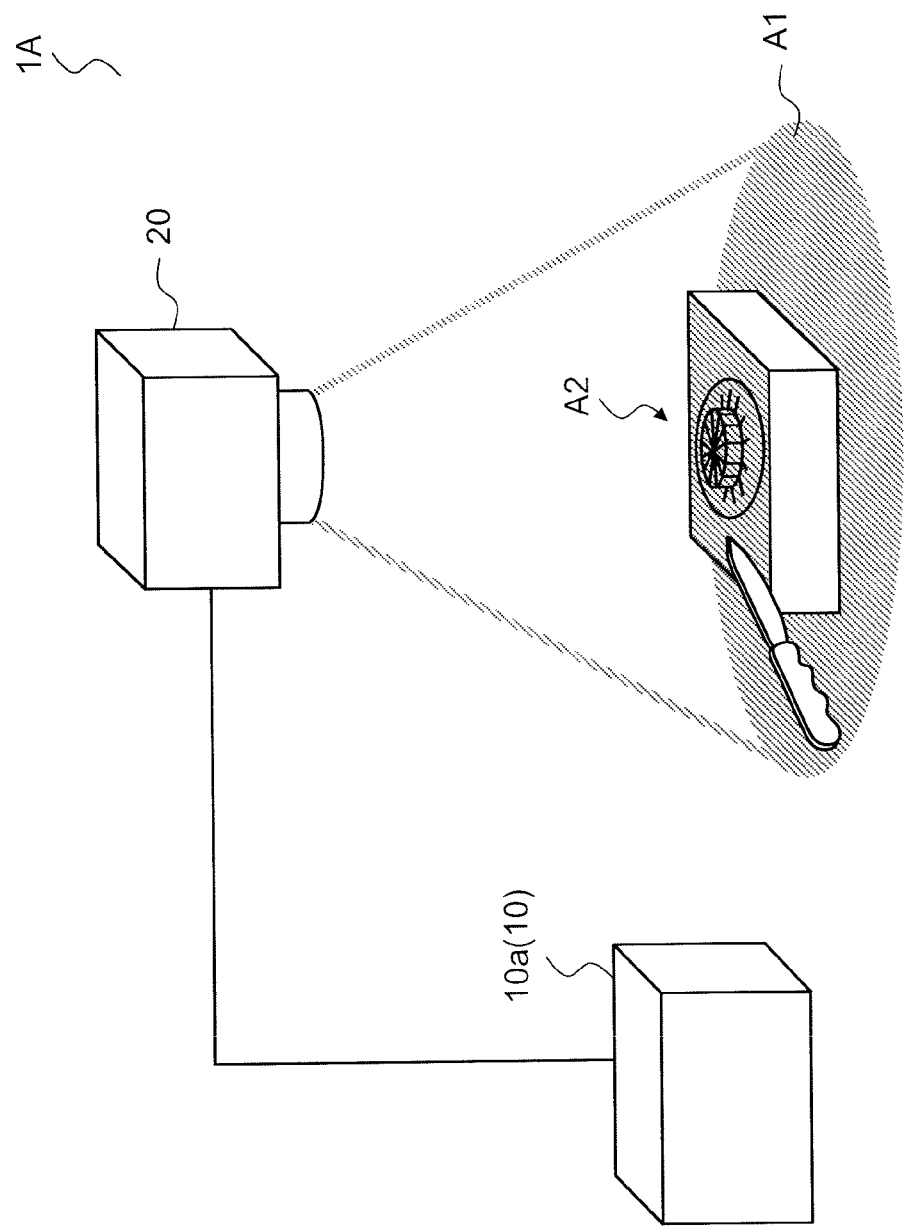
FIG. 1 illustrates examples of an illumination apparatus, and an object and a space irradiated with illumination light, according to a first exemplary embodiment.
Figure 2:
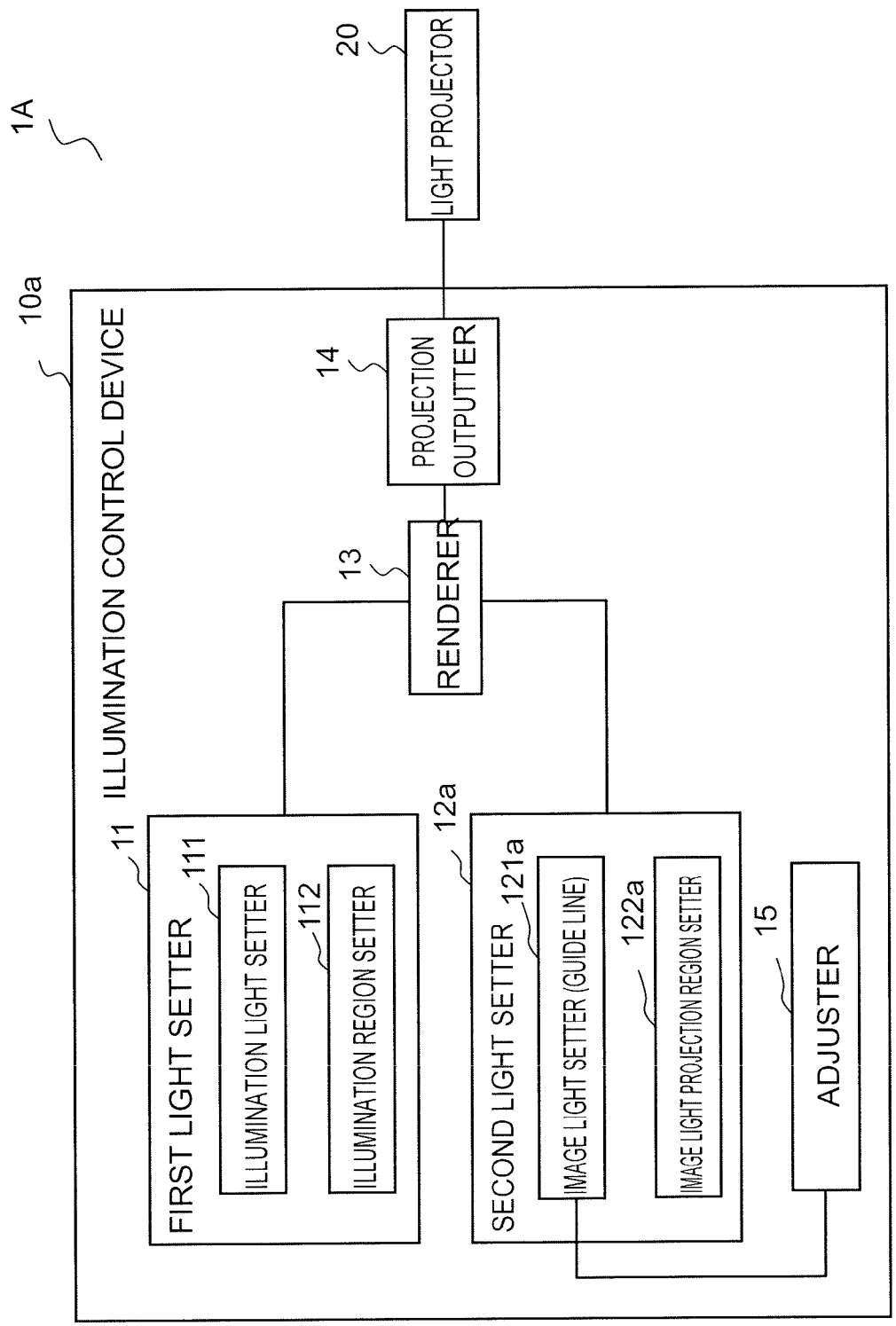
FIG. 2 is a block diagram illustrating a configuration of the illumination apparatus according to the first exemplary embodiment.
Figure 3:
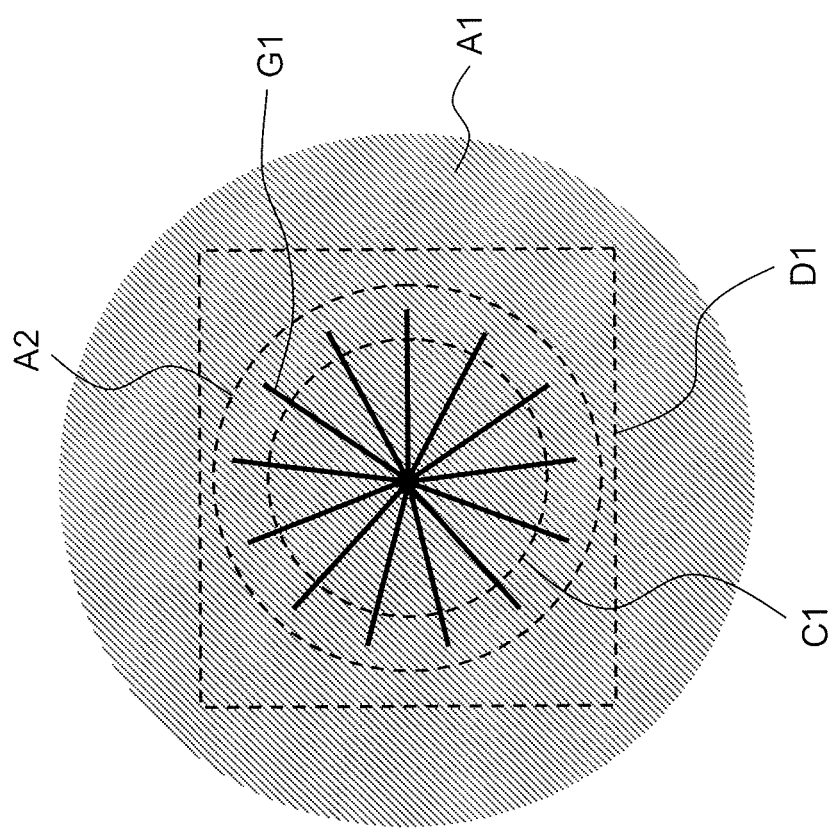
FIG. 3 is a plan view illustrating examples of illumination light and image light in the first exemplary embodiment.

A description is given of illumination apparatus 1A according to a first exemplary embodiment, with reference to FIGS. 1 to 3. FIG. 1 illustrates examples of an external appearance of illumination apparatus 1A, and an object and a space irradiated with illumination light. FIG. 2 is a block diagram illustrating a configuration of illumination apparatus 1A. FIG. 3 illustrates examples of illumination light and image light projected by projection outputter 14.

Illumination apparatus 1A includes illumination light setter 111, image light setter 121a, and light projector 20. Illumination light setter 111 sets illumination light for illuminating a region (illumination area) which includes a space and/or an object. Image light setter 121a sets image light for projecting a projection image which includes a graphic and/or a character, the image light being different from illumination light in at least one of luminance or color. Light projector 20 emits illumination light set by illumination light setter 111, and furthermore projects image light set by image light setter 121a onto an illumination area which is irradiated with the illumination light.

Illumination apparatus 1A can superimpose image light on illumination light, and projects the resultant light. A description is given of the case where illumination apparatus 1A illuminates a workplace and a work object with illumination light, and simultaneously projects an image for assisting work using image light. A description is given of work which is assumed to be cutting cake C1 that is an object (into thirteen equal pieces in FIG. 3).

[Configuration of Illumination Apparatus 1A]

As illustrated in FIGS. 1 and 2, illumination apparatus 1A includes illumination control device 10a, and light projector 20.

As light projector 20, for example, a projector such as DLP (registered trademark, Digital Light Processing) can be used. Light projector 20 may be a projector of another type, or another light projection device other than a projector may be used as light projector 20. Light projector 20 projects illumination light and image light in response to control by illumination control device 10a. Illumination apparatus 1A emits illumination light and projects image light.

Light projector 20 is provided above an object onto which illumination light and image light are projected, as illustrated in FIG. 1.

Illumination control device 10a sets illumination light and image light projected by light projector 20. Illumination control device 10a has a CPU (central processing unit) and a storage device, for example. The CPU executes a computer program (software) indicating an illumination method according to the present exemplary embodiment. Illumination control device 10a can be achieved using an arbitrary device such as an existing server or a PC (personal computer).

Illumination control device 10a includes first light setter 11, second light setter 12a, renderer 13, projection outputter 14, and adjuster 15, as illustrated in FIG. 2.

First light setter 11 sets illumination light for illuminating a region which includes a space and/or an object. More specifically, first light setter 11 sets characteristics of illumination light and an illumination area which is to be irradiated with the illumination light. First light setter 11 includes illumination light setter 111 and illumination region setter 112.

Illumination light setter 111 sets at least one of parameters for the characteristics of illumination light such as illuminance, luminance, a luminous intensity, a color temperature, and a color rendering property of the illumination light. When work of cutting cake C1 is to be performed, illumination light setter 111 sets parameters to make light suitable for the work. Illumination light setter 111 sets parameters to make the illumination light similar to sunlight or make the illumination light white light. Alternatively, illumination light setter 111 sets parameters in order to provide illumination light having a color which makes dishes look delicious.

Illumination region setter 112 sets illumination area A1 which is to be actually irradiated with illumination light, within a region which can be illuminated by illumination apparatus 1A. It should be noted that illumination area A1 may be an entire illuminable region or may be a part of that region. Illumination region setter 112 sets, for example, a position, a size, a shape, and others of illumination area A1. Illumination region setter 112 sets the position of illumination area A1 centering on, for example, a workbench (table) on which cake C1 is placed. Illumination region setter 112 sets the size of illumination area A1 to a size which covers the workbench on which cake C1 is placed and the periphery of the workbench, for example. Illumination region setter 112 sets the shape of illumination area A1 to a round shape, for example.

Second light setter 12a sets image light for projecting a projection image which includes a graphic and/or a character. Second light setter 12a includes image light setter 121a and image light projection region setter 122a (equivalent to a projection region setter).

Image light setter 121a sets a projection image which is to be projected using image light. A projection image includes a graphic for assisting predetermined work which is performed on an object. A projection image is projected onto the object. More specifically, image light setter 121a sets guide line G1 for work of cutting cake C1 which is an object into equal pieces, as a graphic for assisting the work. Image light setter 121a sets parameters for characteristics of guide line G1 such as luminance and a color shade, for example. Thirteen guide lines G1 are set in the present exemplary embodiment.

Image light setter 121a resets (changes one or more settings of) image light according to a reset signal from adjuster 15 described below. Specifically, if a reset signal indicating change of at least one of parameters for luminance and a color shade of image light (for example, guide line) is received, image light setter 121a resets the parameter(s) designated by the reset signal. This changes the luminance and/or color shade of image light which is projected from light projector 20, thus achieving an increase in, for example, the visibility of a projection image.

Image light projection region setter 122a sets the position of projection region A2 onto which a graphic set by image light setter 121a is projected. More specifically, an initial value is preset for a position of projection region A2. This initial value is set so that the midpoint of guide lines G1 and the center of cake C1 overlap. It should be noted that a configuration may be adopted in which a user operation can change (slightly adjust) this initial value.

Renderer 13 executes determination processing for determining whether image light is sufficiently visible, and superimposition processing for superimposing image light on illumination light. A setting of illumination light made by first light setter 11 and a setting of the image light made by second light setter 12 are used for the determination processing and the superimposition processing.

In the determination processing, it is determined whether a difference in luminance between illumination light and image light is a predetermined first determination level or less. Furthermore, in the determination processing, it is determined whether a difference in color shade between illumination light and image light is a predetermined second determination level or less. A configuration may be adopted in which the first determination level and the second determination level can be arbitrarily set or changed by a user. Furthermore, the first determination level and the second determination level may be set to different values according to, for instance, what is done in work. If the first determination level and the second determination level are reset, the reset first and second determination levels may be stored.

If a difference in luminance is the first determination level or less and furthermore, a difference in color shade is the second determination level or less, guide lines may not be sufficiently visible to renderer 13. In that case, renderer 13 automatically adjusts the luminance and/or color shade of image light. Specifically, renderer 13 increases the luminance of guide lines G1, for example. As a result, the luminance of guide lines G1 set by image light setter 121a and the luminance of illumination light set by illumination light setter 111 can be made different from each other by a certain amount or more. Alternatively, renderer 13 may increase color density of guide lines G1. This makes guide lines G1 vividly visible. It should be noted that renderer 13 may be configured to adjust and increase a difference in luminance or color shade which is smaller than the other, or adjust and increase both luminance and a color shade.

Renderer 13 may be configured to check whether to adjust image light or to check with a user, who performs work, what is to be adjusted.

Furthermore, renderer 13 causes a storage (not illustrated) to store a setting of adjusted image light. It should be noted that a configuration may be adopted in which a plurality of settings of image light are prestored, and can be arbitrarily selected.

One light projector 20 can project illumination light and image light by performing superimposition processing. Renderer 13 renders an image to be projected from light projector 20 such that the luminance and color of image light actually projected are the same as illumination light and image light projected from different devices. It should be noted that unlike a projection image, an image projected is a composed image of a projection image and illumination light.

Projection outputter 14 causes light projector 20 to project illumination light and image light rendered by renderer 13.

Adjuster 15 can send a signal which changes at least one of settings of the luminance and color density of image light to image light setter 121a, while light projector 20 is projecting illumination light and image light. Then, adjuster 15 receives change of at least one of parameters for luminance and a color shade of image light according to a user operation. After that, adjuster 15 outputs a reset signal indicating this change to image light setter 121a.

[Illumination Light and Image Light]

FIG. 3 is a plan view of workbench D1 from above, illustrating a positional relationship between workbench D1, cake C1, illumination area A1, projection region A2, and guide lines G1.

As illustrated in FIG. 3, cake C1 is placed on a plate in substantially the center of workbench D1. Workbench D1 is a table, and is rectangular when viewed from above. It should be noted that the shape of the workbench in a top view may be a square or a round, for instance, or an arbitrary shape. Similarly, although the shape of cake C1 in a top view is a round, the shape may be another shape such as a rectangle or square.

Illumination area A1 is a region irradiated with illumination light set by first light setter 11. Illumination area A1 is a round region larger than workbench D1. Illumination area A1 is disposed at a position where the center of the workbench and the center of illumination area A1 overlap.

Projection region A2 is a region onto which image light set by second light setter 12 is projected. The size and shape of projection region A2 are set to substantially the same size and shape of the plate on which cake C1 is placed. In other words, projection region A2 is set to a region having a size and a shape which can cover all guide lines G1 described below. Projection region A2 is provided at a position where the center of the workbench and the center of projection region A2, for instance, overlap.

Guide lines G1 include thirteen lines set such that angles formed by two adjacent lines are all the same, in order that cake C1 can be cut into equal pieces (thirteen equal pieces in FIG. 3). The lengths of all the thirteen lines included in guide lines G1 are the same, and longer than the radius of cake C1. Positions of guide lines G1 are set such that an intersection of guide lines G1 (connecting point of the thirteen lines) illustrated in FIG. 3 is positioned at the center of cake C1.

Advantageous Effects and Others

Illumination apparatus 1A projects, onto illumination light, image light that is different from illumination light in at least one of luminance or color, taking into consideration a relation between the illumination light and the image light. This reduces a possibility that image light does not appear and thus cannot be seen in illumination light.

When foodstuffs are cut with a kitchen knife during cooking, illumination apparatus 1A can project, as image light, one or more guide lines indicating where to cut with the kitchen knife while brightly illuminating a hand with illumination light. In other words, when a user performs predetermined work, illumination apparatus 1A can brightly illuminate with illumination light a hand of the user performing the work, and simultaneously project, onto a work object, an image which includes a graphic for assisting the work. This achieves an improvement in an atmospheric-effect producing function.

Illumination apparatus 1A can superimpose image light on illumination light, and project the illumination light and the image light using one light projector 20. This allows a relation between image light and illumination light (for example, contrast) to be readily adjusted.

Furthermore, a user can adjust the luminance or color shade of image light while illumination apparatus 1A is projecting illumination light and image light. This allows image light to be sufficiently visible. Accordingly, image light can be reliably prevented from not appearing and not being seen in illumination light.

Illumination apparatus 1A can set illumination light according to a space and/or an object. For example, an atmospheric-effect producing function can be improved by a setting for making dishes look delicious, for instance.

Illumination apparatus 1A can simultaneously project a plurality of guide lines as image light, thus improving working efficiency.

Furthermore, illumination apparatus 1A can project one or more guide lines for predetermined work, as image light. This can improve working efficiency and shorten working time. Furthermore, shortening the working time achieves a decrease in a time period to project illumination light and image light by illumination apparatus 1A, and consequently achieves a reduction in power consumption.

Second Exemplary Embodiment

Figure 4:
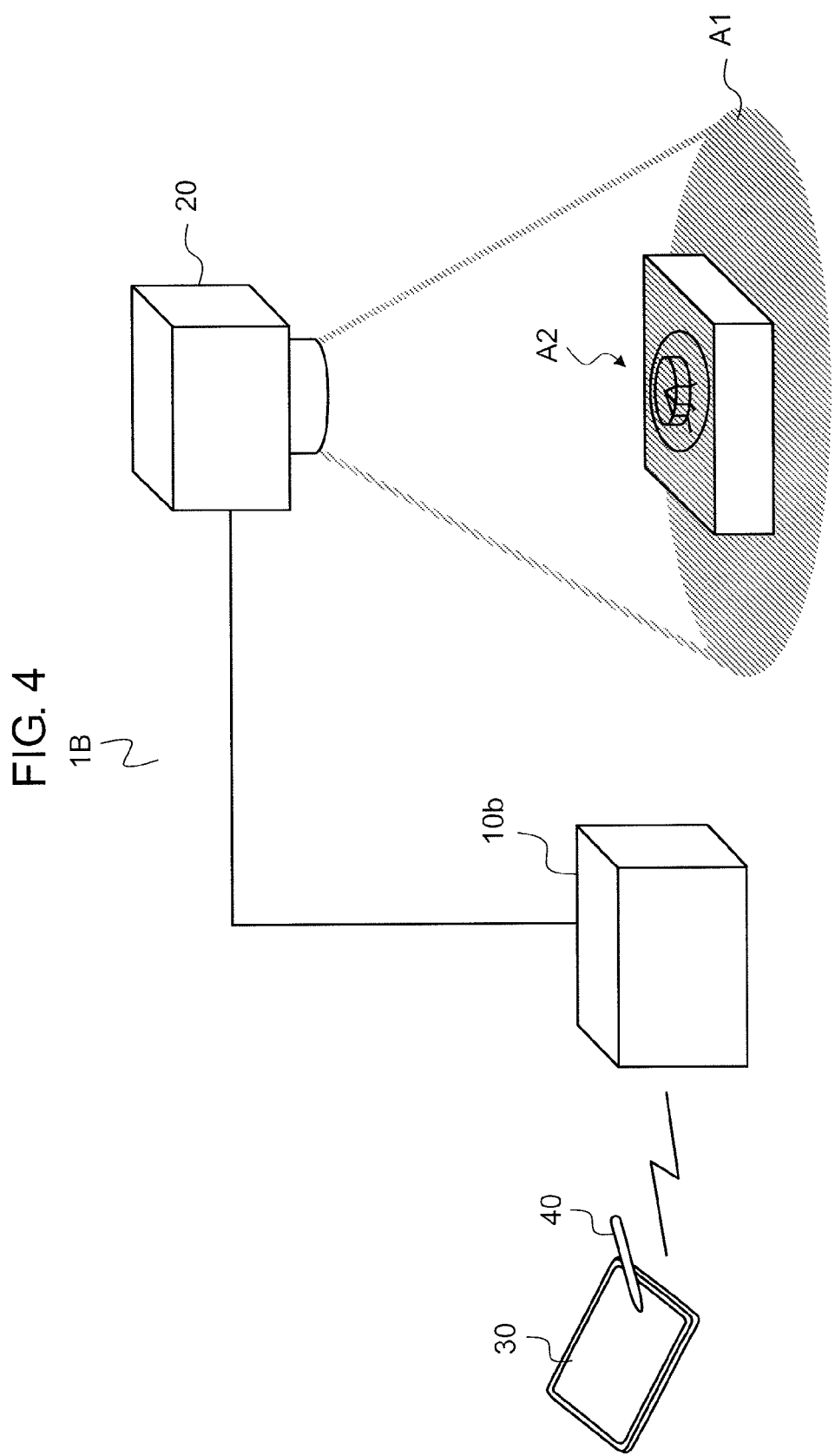
FIG. 4 illustrates examples of an illumination apparatus, and an object and a space irradiated with illumination light, according to a second exemplary embodiment.
Figure 5:
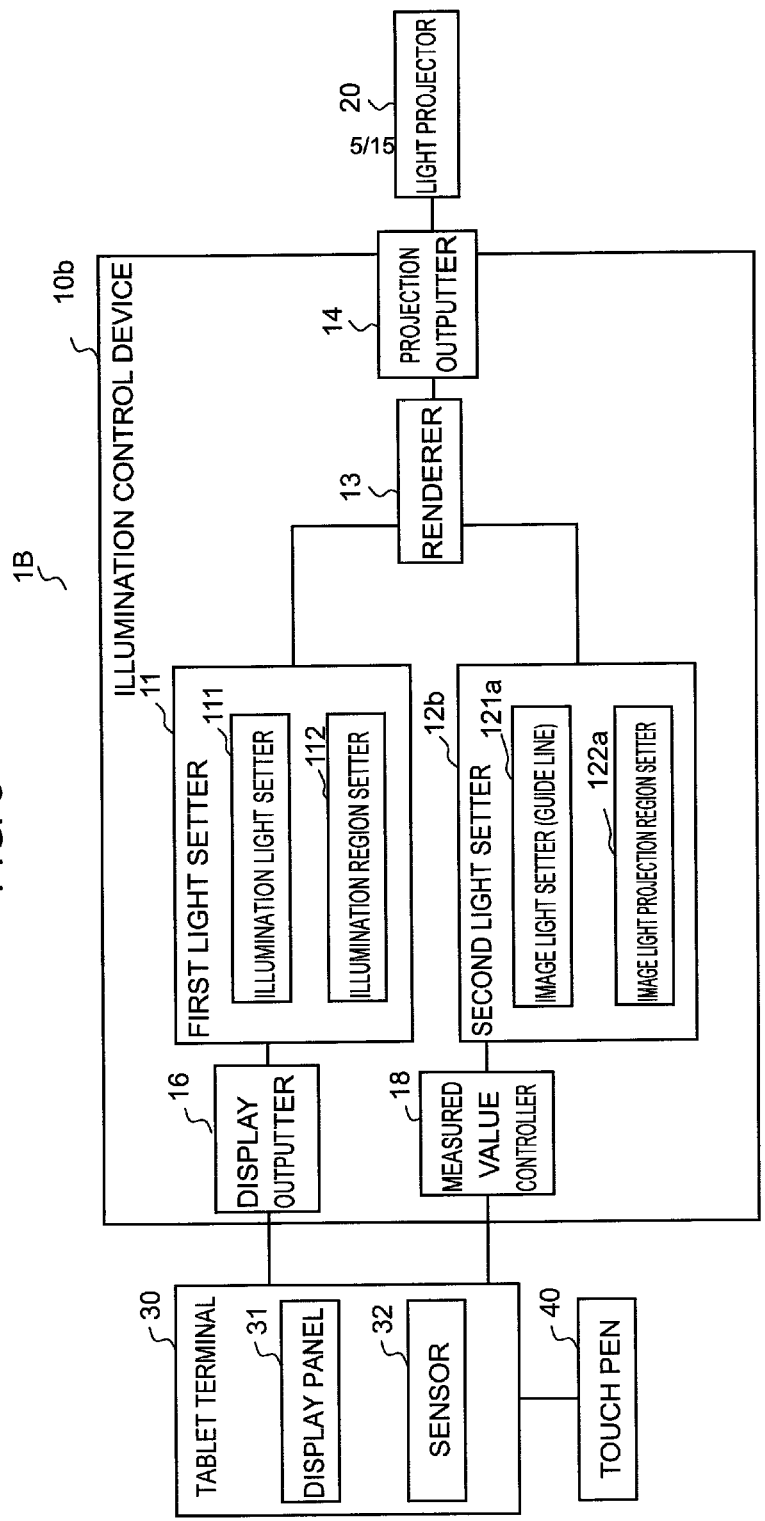
FIG. 5 is a block diagram illustrating a configuration of the illumination apparatus according to the second exemplary embodiment.
Figure 6:
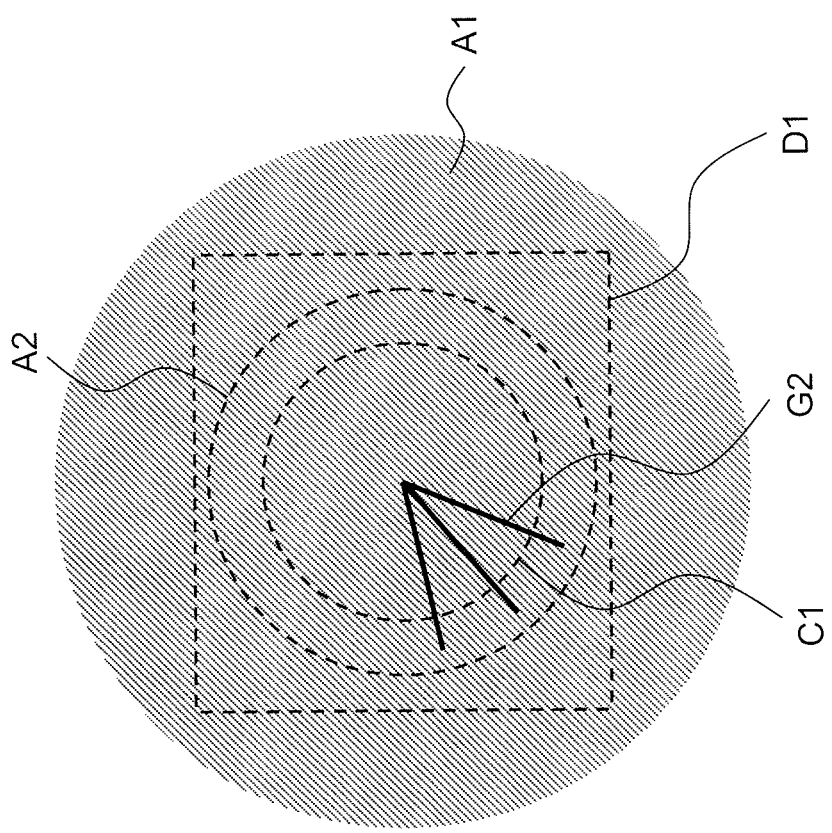
FIG. 6 is a plan view illustrating examples of illumination light and image light in the second exemplary embodiment.

A description is given of illumination apparatus 1B according to a second exemplary embodiment, with reference to FIGS. 4 to 6. FIG. 4 illustrates examples of an external appearance of illumination apparatus 1B, and an object and a space irradiated with illumination light. FIG. 5 is a block diagram illustrating a configuration of illumination apparatus 1B.

It should be noted that illumination apparatus 1A according to the first exemplary embodiment projects preset guide lines G1 (graphic) as image light, whereas illumination apparatus 1B projects an image input via a terminal such as tablet terminal 30, in real time as image light. The other configuration is the same as that of illumination apparatus 1A.

The present exemplary embodiment also describes the case of work assumed to be cutting cake C1, as with the first exemplary embodiment.

[Configuration of Tablet Terminal 30]

Tablet terminal 30 serving as an operation terminal is a capacitive touch panel. As illustrated in FIG. 5, tablet terminal 30 includes display panel 31 which displays an image, and sensor 32 (for example, touch-sensor) which detects a touched position on display panel 31. Tablet terminal 30 is operated via touch pen 40. As for tablet terminal 30, sensor 32 detects, using a sensor (not illustrated), a position (coordinates on display panel 31) where touch pen 40 has touched. Accordingly, tablet terminal 30 is an operation terminal serving as both a display device and an input device, and includes: display panel 31 which receives and displays a setting of illumination light from illumination light setter 111; and sensor 32 which detects an input operation on display panel 31.

Tablet terminal 30 receives a setting of illumination light from illumination light setter 111, and displays, on display panel 31, an image indicating an illumination area of illumination light. Furthermore, after displaying the image indicating the illumination area of illumination light, tablet terminal 30 receives, via touch pen 40, input of information on one or more guide lines as a projection image projected using image light, and outputs the information to illumination control device 10b.

Specifically, for example, using tablet terminal 30, a user designates two points, namely a start point and an end point with touch pen 40, in order to cause image light setter 121b to set a linear guide line. Tablet terminal 30 may output positions of the two points, namely the start point and the end point, to illumination control device 10b as positional information from the input operation. Alternatively, the user designates three or more points including a start point, an end point, and a middle point with touch pen 40 in order to set a curved guide line using tablet terminal 30. Tablet terminal 30 may output, to illumination control device 10b, information on the three or more points as positional information. Alternatively, tablet terminal 30 may output positional information indicating a trajectory of positions of touch pen 40 to illumination control device 10b, for example. In this case, taking a hand shake, for instance, into consideration, tablet terminal 30 may obtain a fitted curve or straight line or a combination of a fitted curve and a fitted straight line of the trajectory of positions, and output, to illumination control device 10b, information on the fitted curve or straight line or a combination of the fitted curve and straight line, as positional information. Alternatively, tablet terminal 30 may be configured to allow a use of a fitted curve and a fitted straight line which are arbitrarily switched or combined. Accordingly, based on positional information input from tablet terminal 30, light projector 20 may emit a plurality of lines onto an object.

Thus, image light setter 121b can set, based on the positional information, a plurality of lines projected onto an object, as a projection image which is projected from light projector 20.

Furthermore, tablet terminal 30 is configured to receive a change of one of parameters for the luminance and color shade of image light while light projector 20 of illumination apparatus 1B is projecting illumination light and image light. Upon receiving the change, tablet terminal 30 outputs a reset signal indicating that change to image light setter 121b.

In other words, tablet terminal 30 has a function of adjuster 15 according to the first exemplary embodiment. It should be noted that tablet terminal 30 may be a dedicated terminal or a general purpose terminal on which application software is installed.

[Configuration of Illumination Apparatus 1B]

As illustrated in FIGS. 4 and 5, illumination apparatus 1B includes illumination control device 10b and light projector 20. The configuration of light projector 20 is the same as that of illumination apparatus 1A. Furthermore, illumination control device 10b is configured to be communicable with tablet terminal 30 in a wireless or wired manner.

Illumination control device 10b is a device which sets illumination light and image light projected by light projector 20. Illumination control device 10b has a CPU and a storage device, as with illumination control device 10a of illumination apparatus 1A, for example. The CPU executes a computer program indicating an illumination method according to the present exemplary embodiment.

Illumination control device 10b includes display outputter 16, measured value controller 18, first light setter 11, second light setter 12b, renderer 13, and projection outputter 14, as illustrated in FIG. 5. The configurations of first light setter 11, renderer 13, and projection outputter 14 are same as those of illumination apparatus 1A.

Display outputter 16 receives a setting of illumination light from first light setter 11, and outputs image data for displaying, on display panel 31 of tablet terminal 30, an image indicating illumination area A1 (outer frame of illumination area A1). Furthermore, display outputter 16 displays, on display panel 31, a graphic illustrating a virtual position (and also a shape) of an object (cake C1 in the present exemplary embodiment).

It should be noted that although illumination area A1 and a virtual position of an object are displayed on display panel 31 in the present exemplary embodiment, the present disclosure is not limit to this. For example, an image which includes an object and illumination area A1 is captured using an imaging device (not illustrated) while the object and illumination area A1 are irradiated with illumination light, and the captured image may be displayed on display panel 31. In other words, an image of an object (cake C1) may be displayed on display panel 31.

Second light setter 12b sets image light. Second light setter 12b includes image light setter 121b and image light projection region setter 122b.

Image light setter 121b sets a projection image which is projected using image light. Specifically, image light setter 121b receives positional information in relation to an image displayed on display panel 31, from tablet terminal 30 which is an operation terminal. The image displayed on display panel 31 is based on image data output from display outputter 16 to tablet terminal 30. Furthermore, image light setter 121b sets a projection image such as a guide line, using positional information.

Image light setter 121b may recognize a start point from one piece of positional information and an end point from another piece of positional information, and set a line which connects the start point and the end point. Alternatively, if positional information indicates three or more points including a start point, an end point, and a middle point for rendering a curve, image light setter 121b may set a circular arc which passes through these points. Alternatively, if positional information indicates a trajectory of positions of touch pen 40, image light setter 121b may set the trajectory of positions as it is. In this case, image light setter 121b may set a fitted curve or straight line or a combination of a fitted curve and a fitted straight line obtained from positional information.

Image light setter 121b resets (changes one or more settings of) image light according to a reset signal from tablet terminal 30. Specifically, image light setter 121b receives a reset signal indicating change of at least one of parameters for the luminance and color shade of image light, as with the first exemplary embodiment. After that, image light setter 121b resets the parameter(s) designated by the reset signal. This changes the luminance and/or color shade of image light which is projected from light projector 20.

Image light projection region setter 122b sets a position of a projection region of image light such that a relation between illumination light and image light (guide line) on tablet terminal 30 is maintained. It should be noted that a configuration may be adopted in which a user operation can change (slightly adjust) this position.

[Illumination Light and Image Light]

FIG. 6 illustrates an example of illumination light and image light projected by projection outputter 14 according to the present exemplary embodiment. FIG. 6 is a plan view of workbench D1 when viewed from above. FIG. 6 illustrates a positional relationship between illumination area A1, projection region A2, guide lines G2, and workbench D1.

It should be noted that the configurations of illumination area A1 and projection region A2 are the same as those in the first exemplary embodiment.

Guide line G2 is a line for cutting cake C1 as with the first exemplary embodiment, and the position of guide line G2 is determined by a line drawn on tablet terminal 30. FIG. 6 illustrates the case where a start point and an end point are designated and a straight line is rendered via tablet terminal 30. Although guide lines G2 include three straight lines in FIG. 6, the present disclosure is not limited to this.

Advantageous Effects and Others

A user inputs positional information with touch pen 40 on display panel 31 of tablet terminal 30, thereby allowing illumination apparatus 1B to render a graphic using image light. In this case, a detailed graphic can be rendered for each work object in accordance with, for instance, the shape of the work object. Illumination apparatus 1B achieves equivalent effects to those achieved by illumination apparatus 1A according to the first exemplary embodiment.

Third Exemplary Embodiment

Figure 7:
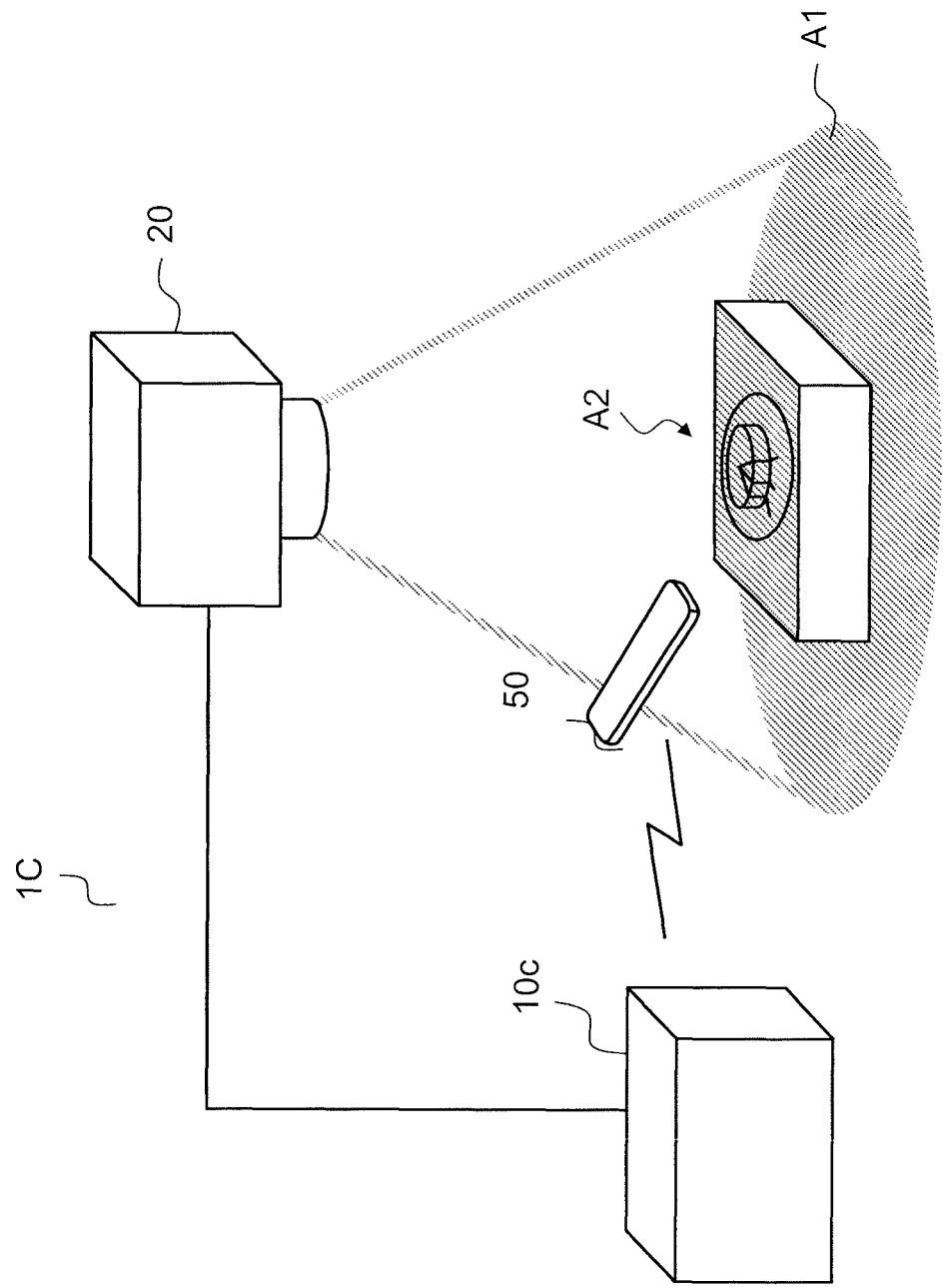
FIG. 7 illustrates examples of an illumination apparatus, and an object and a space irradiated with illumination light, according to a third exemplary embodiment.
Figure 8:
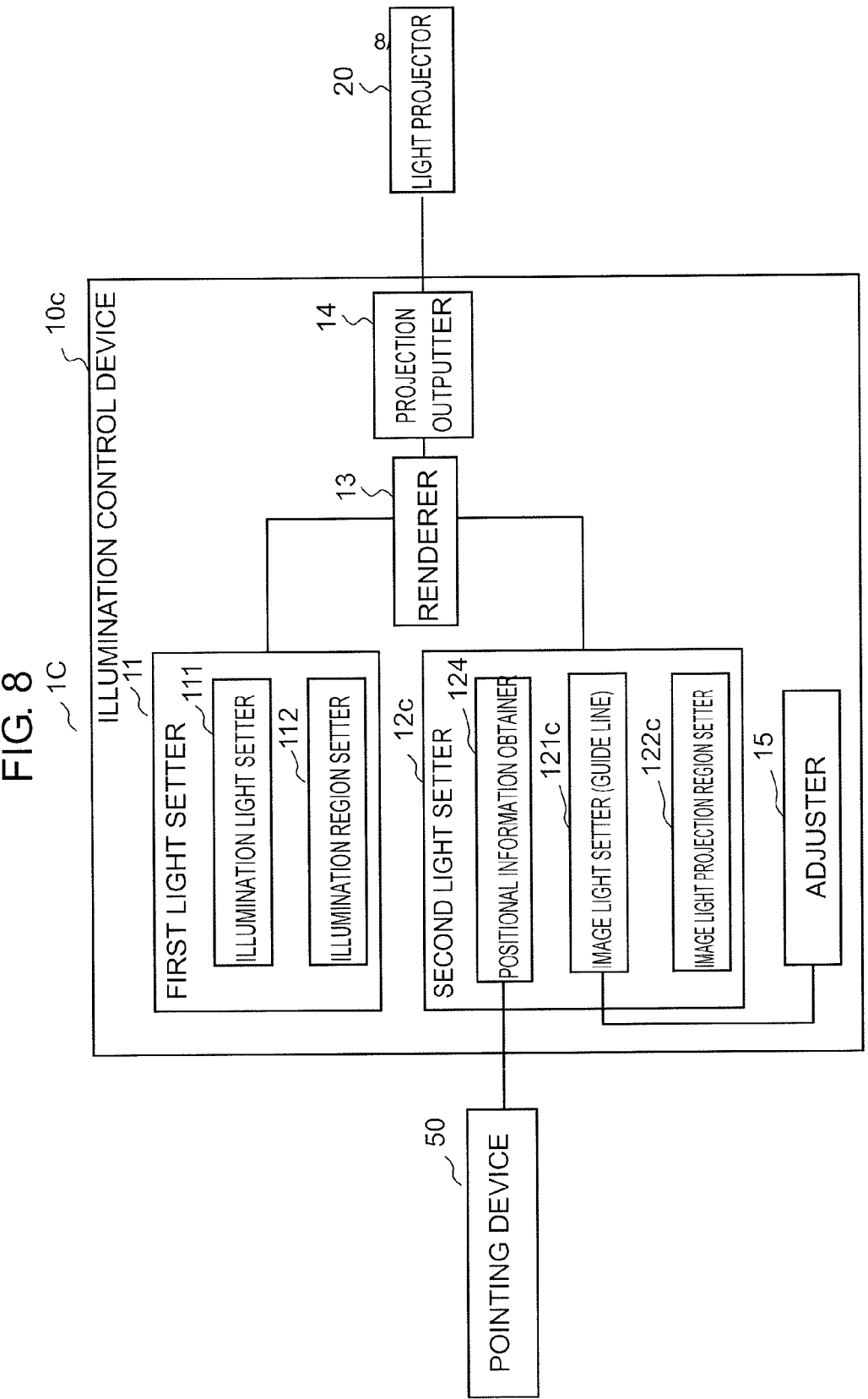
FIG. 8 is a block diagram illustrating a configuration of an illumination apparatus according to a third exemplary embodiment.

A description is given of illumination apparatus 1C according to a third exemplary embodiment, with reference to FIGS. 7 and 8. FIG. 7 illustrates examples of an external appearance of illumination apparatus 1C, and an object and a space irradiated with illumination light. FIG. 8 is a block diagram illustrating a configuration of illumination apparatus 1C.

It should be noted that according to the first exemplary embodiment, illumination apparatus 1A projects preset guide lines G1 as image light. According to the second exemplary embodiment, illumination apparatus 1B projects guide lines G2 input via tablet terminal 30 as image light. In contrast, illumination apparatus 1C projects, as image light, a guide line rendered according to operation of an operation terminal, onto a work object (which does not need to be touched) in real time. Other configuration is the same as illumination apparatuses 1A and 1B.

A description is given assuming the case of work of cutting a cake, as with the first and second exemplary embodiments.

[Configuration of Pointing Device 50]

The present exemplary embodiment describes an example of using pointing device 50 as an operation terminal. Pointing device 50 is a gyroscope provided remote controller which includes a sensor which detects angular velocity, and a plurality of buttons, for example. The sensor for detecting angular velocity detects angular velocity for determining three arbitrary directions, for example. Pointing device 50 outputs this angular velocity as positional information, to illumination apparatus 1C. For example, when a user presses a button of pointing device 50, pointing device 50 outputs information on the pressed button as positional information.

[Configuration of Illumination Apparatus 1C]

As illustrated in FIGS. 7 and 8, illumination apparatus 1C includes illumination control device 10c and light projector 20. The configuration of light projector 20 is the same as those of illumination apparatuses 1A and 1B. In addition, illumination apparatus 1C is configured to be wirelessly communicable with pointing device 50.

Illumination control device 10c sets illumination light and image light projected by light projector 20. Illumination control device 10c includes, for example, a CPU and a storage device as with illumination apparatuses 1A and 1B. The CPU executes a computer program indicating an illumination method according to the present exemplary embodiment.

Illumination control device 10c includes first light setter 11, second light setter 12c, renderer 13, projection outputter 14, and adjuster 15, as illustrated in FIG. 8. The configurations of first light setter 11, renderer 13, and projection outputter 14 are the same as those of illumination apparatuses 1A and 1B.

Second light setter 12c sets image light. Second light setter 12c includes positional information obtainer 124, image light setter 121c, and image light projection region setter 122c.

Positional information obtainer 124 obtains positional information of a position on an object from pointing device 50, and outputs the positional information to image light setter 121c.

Image light setter 121c sets a projection image which is projected using image light. Specifically, image light setter 121c sets a projection image such as a guide line, using the positional information output from positional information obtainer 124.

Specifically, image light setter 121c can be always informed of a position on an object instructed by pointing device 50 (position on illumination light), from angular velocity information (information indicating a change in a position). In this manner, image light setter 121c recognizes a position of pointing device 50, based on a time at which a button is pressed. Image light setter 121c can use the recognized position as a position of a start point or an end point for drawing a straight line, or a position of a start point, an end point, and a middle point for drawing a curve. Alternatively, image light setter 121c may use, as a guide line as it is, a trajectory of positions of pointing device 50 in a period during which a button is being pressed.

Furthermore, image light setter 121c is configured to reset (change one or more settings of) image light according to a reset signal from adjuster 15, as with illumination apparatus 1A.

Image light projection region setter 122c sets a position of a projection region of image light such that a position on an object provided by pointing device 50 (position on illumination light) and a position of projected image light (guide line) overlap. It should be noted that a configuration may be adopted in which a user operation changes (slightly adjusts) a position of a projection region (guide line).

Advantageous Effects and Others

According to this configuration, illumination light and image light projected in the present exemplary embodiment are eventually the same as the illumination light and image light in the second exemplary embodiment illustrated in FIG. 6.

A position of a guide line is set on an object using pointing device 50, and thus a relation between a work object and a guide line can be grasped with further ease. A guide line is directly set on a work object, and thus a setting can be changed with ease. Furthermore, illumination apparatus 1C achieves equivalent effects to those achieved by illumination apparatus 1A according to the first exemplary embodiment and illumination apparatus 1B according to the second exemplary embodiment.

Fourth Exemplary Embodiment

Figure 9:
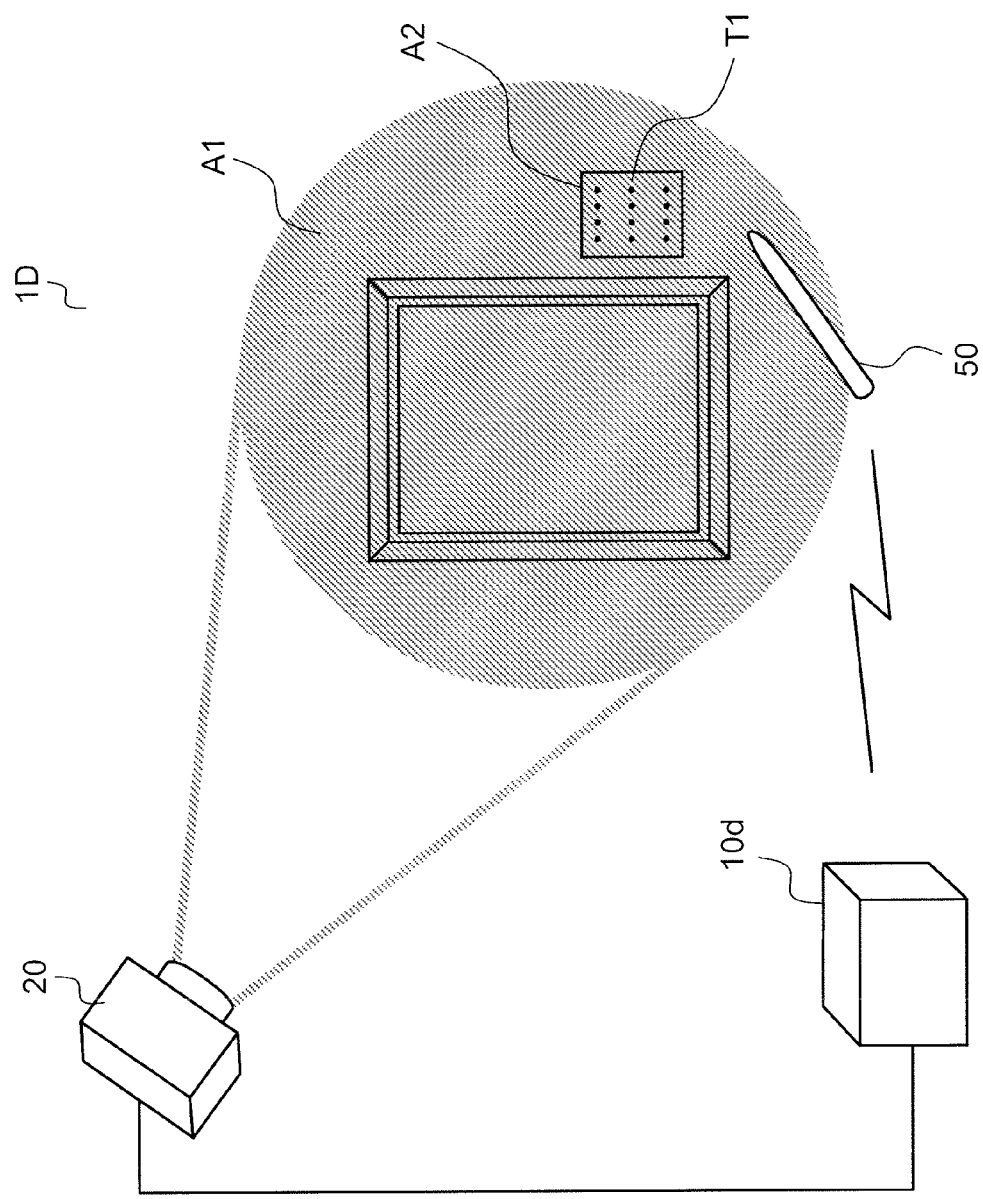
FIG. 9 illustrates examples of an illumination apparatus, and an object and a space irradiated with illumination light, according to a fourth exemplary embodiment.
Figure 10:
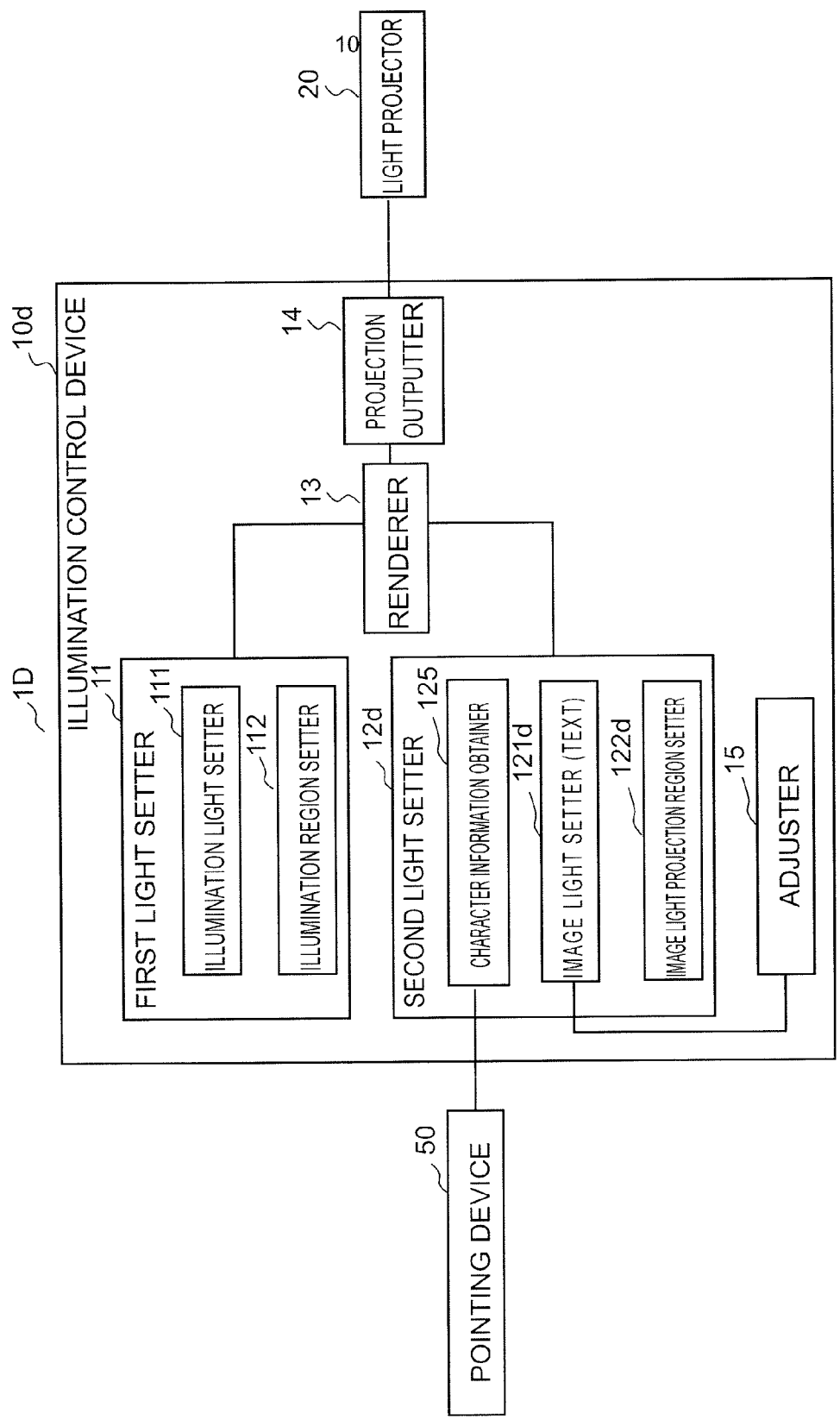
FIG. 10 is a block diagram illustrating a configuration of the illumination apparatus according to the fourth exemplary embodiment.
Figure 11:
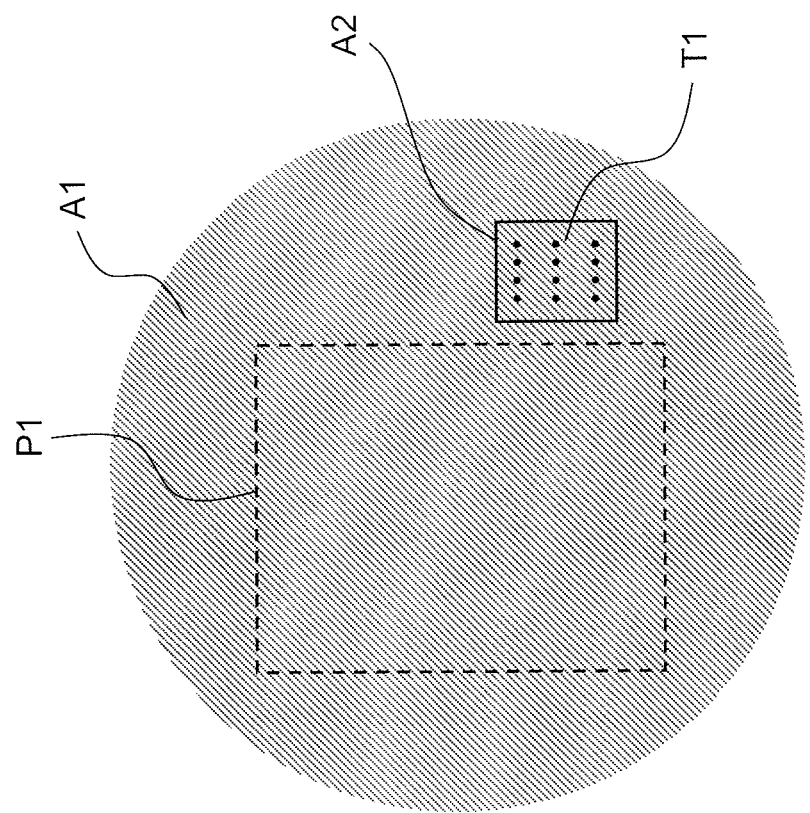
FIG. 11 is a plan view illustrating examples of illumination light and image light in the fourth exemplary embodiment.

A description is given of illumination apparatus 1D according to a fourth exemplary embodiment with reference to FIGS. 9 to 11. FIG. 9 illustrates examples of an external appearance of illumination apparatus 1D, and an object and a space irradiated with illumination light. FIG. 10 is a block diagram illustrating a configuration of illumination apparatus 1D. FIG. 11 illustrates examples of illumination light and image light projected by projection outputter 14.

It should be noted that although in the first to third exemplary embodiments, illumination apparatuses 1A to 1C project, as image light, guide lines for assisting predetermined work, illumination apparatus 1D displays character information (text) as image light. Furthermore, information on a character is obtained from positional information output from pointing device 50 which is an operation terminal, and this information on the character is displayed within projection region A2. Other configuration is the same as those of illumination apparatuses 1A to 1C.

The present exemplary embodiment describes the case where paintings are irradiated with illumination light, and a text explaining a painting is displayed in a region adjacent to the painting.

It should be noted that the configuration of pointing device 50 is the same as that of illumination apparatus 1C.

[Configuration of Illumination Apparatus 1D]

As illustrated in FIGS. 9 and 10, illumination apparatus 1D includes illumination control device 10$d$ and light projector 20. The configuration of light projector 20 is the same as those described in the first to third exemplary embodiments. Furthermore, illumination apparatus 1D is configured to be wirelessly communicable with pointing device 50.

Illumination control device 10$d$ sets illumination light and image light projected by light projector 20. Illumination control device 10$d$ includes, for example, a CPU and a storage device as with illumination apparatuses 1A to 1C. The CPU executes a computer program indicating an illumination method.

Illumination control device 10$d$ includes first light setter 11, second light setter 12$d$, renderer 13, projection outputter 14, and adjuster 15, as illustrated in FIG. 10. Basically, the configurations of first light setter 11, renderer 13, and projection outputter 14 are the same as those of illumination apparatuses 1A to 1C. It should be noted that illumination light setter 111 of first light setter 11 sets parameters of illumination light so as to decrease ultraviolet rays which may cause a deterioration of paintings.

Second light setter 12$d$ sets image light. Second light setter 12$d$ includes character information obtainer 125, image light setter 121$d$, and image light projection region setter 122$d$.

Character information obtainer 125 obtains character information using positional information output from pointing device 50. For example, character information obtainer 125 obtains character information by recognizing a character using the positional information provided by pointing device 50 during a period when a button (not illustrated) of pointing device 50 is being pressed. It should be noted that a method of recognizing a character may be a known method.

Image light setter 121$d$ sets a projection image which is projected using image light. A projection image includes preset character information (text). More specifically, image light setter 121$d$ receives character information from character information obtainer 125, and sets a text which is projected as a projection image. Furthermore, image light setter 121$d$ sets parameters for text characteristics such as a font, luminance, a color (or pattern), and a color shade of a character, for example.

Furthermore, image light setter 121$d$ resets (changes one or more settings of) image light according to a reset signal from adjuster 15. Specifically, image light setter 121$d$ receives a reset signal indicating change of at least one of parameters for the luminance and color shade of image light (here, text). After that, image light setter 121$d$ resets a parameter designated by the reset signal. This changes the luminance and/or color shade of image light which is projected from light projector 20.

Image light projection region setter 122$d$ sets a position of a projection region of image light. Specifically, image light projection region setter 122$d$ sets a position of a projection region of image light as a position adjacent to an object to be irradiated with illumination light. It should be noted that a configuration may be adopted in which a user operation can change (slightly adjust) this position.

[Illumination Light and Image Light]

FIG. 11 is a plan view of painting P1 when viewed from the front (horizontally). FIG. 11 illustrates a positional relationship between illumination area A1, projection region A2, text T1, and painting P1. Illumination area A1 is a round region which includes painting P1 (object). Projection region A2 is set on the right side of painting P1. Text T1 is displayed in projection region A2. It should be noted that a background and a text which are set by image light setter 121$d$ are projected within projection region A2.

Advantageous Effects and Others

Illumination apparatus 1D can irradiate a painting which may deteriorate due to ultraviolet rays, with illumination light having low illuminance, and simultaneously project an explanation as image light, next to such a painting. For example, if an explanation of a painting is provided in, for instance, a printed form, this explanation may be difficult to read due to low illuminance of illumination light. Illumination apparatus 1D can adjust a setting of image light for projecting character information such as an explanation, taking illumination light into consideration. Accordingly, a person enjoying a painting can read a text with further ease. Illumination apparatus 1D is useful to display character information when the illuminance of illumination light is restricted.

Illumination apparatus 1D achieves equivalent effects to those achieved by illumination apparatus 1A according to the first exemplary embodiment.

Fifth Exemplary Embodiment

Figure 12:
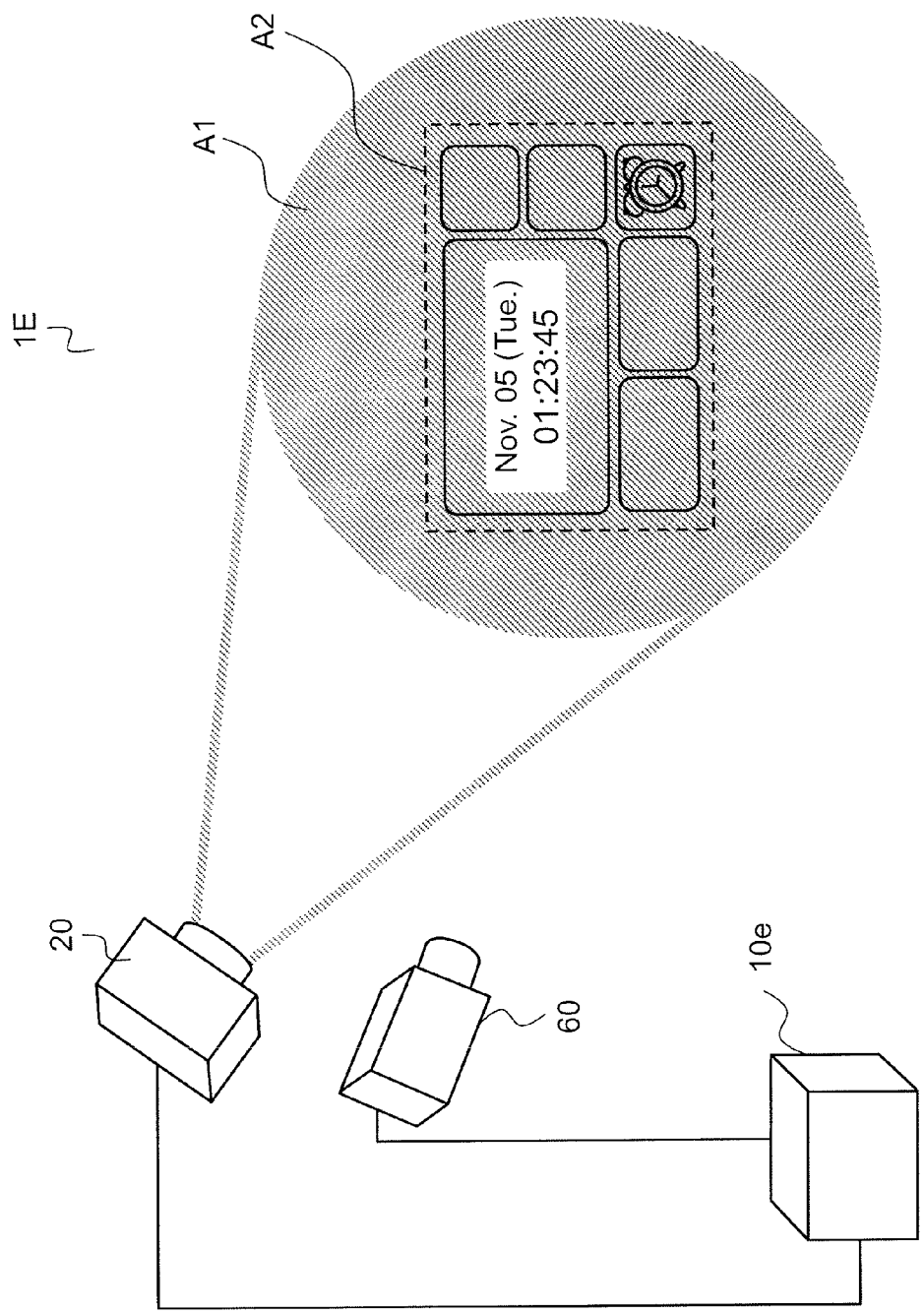
FIG. 12 illustrates examples of an illumination apparatus, and an object and a space irradiated with illumination light, according to a fifth exemplary embodiment.
Figure 13:
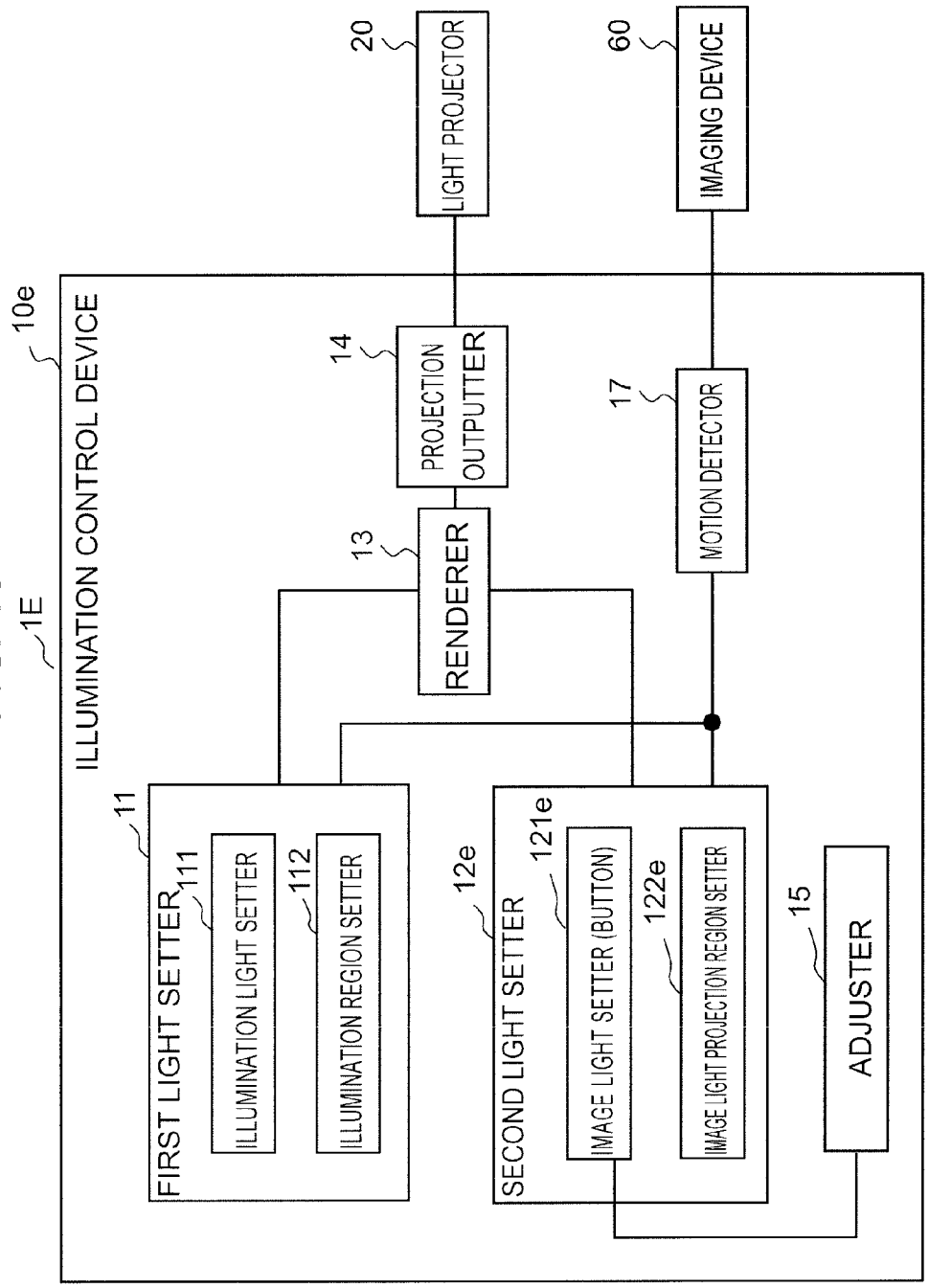
FIG. 13 is a block diagram illustrating a configuration of the illumination apparatus according to the fifth exemplary embodiment.
Figure 14:
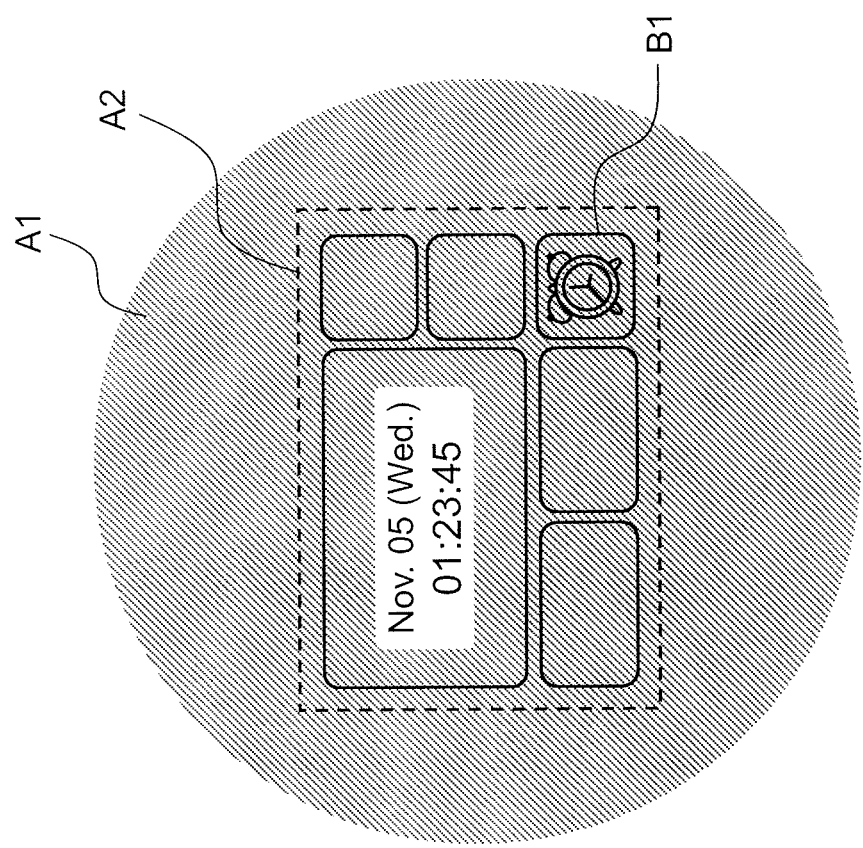
FIG. 14 is a plan view illustrating examples of illumination light and image light in the fifth exemplary embodiment.

A description is given of illumination apparatus 1E according to a fifth exemplary embodiment, with reference to FIGS. 12 to 14. FIG. 12 illustrates examples of an external appearance of illumination apparatus, and an object and a space irradiated with illumination light. FIG. 13 is a block diagram illustrating a configuration of illumination apparatus 1E. FIG. 14 illustrates examples of illumination light and image light projected by projection outputter 14.

In the first to third exemplary embodiments, illumination apparatuses 1A to 1C project, as image light, guide lines for assisting predetermined work. In the fourth exemplary embodiment, illumination apparatus 1D projects a text. In contrast, illumination apparatus 1E displays an image of a button associated with a predetermined function, as image light. Other configurations are the same as those of illumination apparatuses 1A to 1D.

The present exemplary embodiment describes the case where illumination light is projected inside a room (for example, bedside), and image light is projected onto a wall surface adjacent to the bedside.

[Configuration of Illumination Apparatus 1D]

As illustrated in FIGS. 12 and 13, illumination apparatus 1E includes imaging device 60, illumination control device 10e, and light projector 20. The configuration of light projector 20 is the same as those of illumination apparatuses 1A to 1C.

Imaging device 60 is a camera in which a CCD (charge-coupled device) is used, for example. It should be noted that imaging device 60 is not limited to this.

Illumination control device 10e sets illumination light and image light projected by light projector 20. Illumination control device 10e includes, for example, a CPU and a storage device as with illumination apparatuses 1A to 1D. The CPU executes a computer program indicating an illumination method.

Illumination control device 10e includes first light setter 11, second light setter 12e, renderer 13, projection outputter 14, adjuster 15, and motion detector 17, as illustrated in FIG. 13. The configurations of first light setter 11, renderer 13, and projection outputter 14 are the same as those of illumination apparatuses 1A to 1D.

Second light setter 12e sets image light. Second light setter 12e includes image light setter 121e and image light projection region setter 122e.

Image light setter 121e sets a projection image projected using image light. Specifically, image light setter 121e renders an image which includes a button associated with a predetermined function, as a projection image. Examples of a predetermined function may include functions of illumination apparatus 1E such as termination of projection of illumination light and image light, and change of settings of the illumination light (such as illuminance and color temperature, for example), and functions of an external device of illumination apparatus 1E.

Furthermore, image light setter 121e resets (changes one or more settings of) image light according to a reset signal from adjuster 15. Specifically, image light setter 121e receives a reset signal indicating change of at least one of parameters for luminance and a color shade of image light (here, button). After that, image light setter 121e resets the parameter(s) designated by the reset signal. This changes the luminance and/or color shade of image light which is projected from light projector 20.

Image light projection region setter 122e sets a position of a projection region of image light. It should be noted that a configuration may be adopted in which a user operation can change (slightly adjust) this position.

Motion detector 17 detects a motion of a user. Specifically, imaging device 60 captures an image of a projection region of image light during a period when illumination light and image light are projected. Then, motion detector 17 analyzes the image captured by imaging device 60, and detects a motion of selecting a button as mentioned above.

Motion detector 17 determines that this button is pressed if a user keeps touching with hand an image of a button projected on the wall surface, for more than a certain period or more, for example.

Furthermore, motion detector 17 executes a function associated with this button. For example, if this button is associated with termination of projection of illumination light and image light, motion detector 17 terminates projection of illumination light and image light via projection outputter 14, for instance. Alternatively, for example, if this button is associated with change of a setting of illumination light (such as illuminance), motion detector 17 changes the setting of the illumination light. A configuration may be adopted in which a setting of illuminance is sequentially changed each time this button is selected in such a case.

[Illumination Light and Image Light]

FIG. 14 illustrates a configuration in which a bedroom is illuminated and image light is projected onto the wall of the bedroom. FIG. 14 illustrates a positional relationship between illumination area A1, projection region A2, and button B1.

In FIG. 14, illumination area A1 is indicated by a round region. It should be noted that the entire bedroom or a partial region which includes a bedside and the periphery of the bedside may be set as illumination area A1.

Projection region A2 is set on the wall surface at a bedside. More specifically, projection region A2 is a partial region set on the wall surface at the bedside, which can be reached by a person lying on a bed.

Button B1 is an image of a button included in a projection image projected in projection region A2. In FIG. 14, a projection image includes an image of a clock and five buttons. For example, selecting lower right button B1 allows making a setting of a time at which illumination apparatus 1E stops or starts projecting illumination light and image light.

It should be noted that FIG. 14 illustrates the case where the display includes not only button B1 but other buttons and a clock, as a projection image projected using image light.

For example, if a person lying on the bed makes a motion of touching button B1, motion detector 17 of illumination apparatus 1E detects this motion, and executes a function associated with button B1.

Advantageous Effects and Others

According to the present exemplary embodiment, renderer 13 can adjust settings of illumination light and image light as with the first to fourth exemplary embodiments. This allows illumination apparatus 1E to automatically set illumination light and image light in conjunction, to prevent the image light from not appearing. Furthermore, illumination apparatus 1E achieves equivalent effects to those achieved by illumination apparatuses 1A to 1D.

Other Exemplary Embodiments

The first to third exemplary embodiments have described the case of predetermined work of cutting a cake, but the present disclosure is not limited to this. The predetermined work may be arbitrary work such as cooking, craft, and medical treatment.

Although illumination apparatuses 1A to 1C project guide lines as image light in the first to third exemplary embodiments, the present disclosure is not limited to this. It is sufficient if image light achieves an image which can assist work.

Although a round region is set in the first to third exemplary embodiments as illumination area A1 irradiated with illumination light, the present disclosure is not limited to this. Illumination area A1 may have an arbitrary shape such as a rectangle, an oval, a doughnut shape, or a combination of such shapes. Illumination area A1 can be set such that the entire object on which work is to be performed is positioned inside illumination area A1.

Although guide lines are displayed as image light in the first to third exemplary embodiments and a text is displayed as image light in the fourth exemplary embodiment, these exemplary embodiments may be combined.

Figure 15:
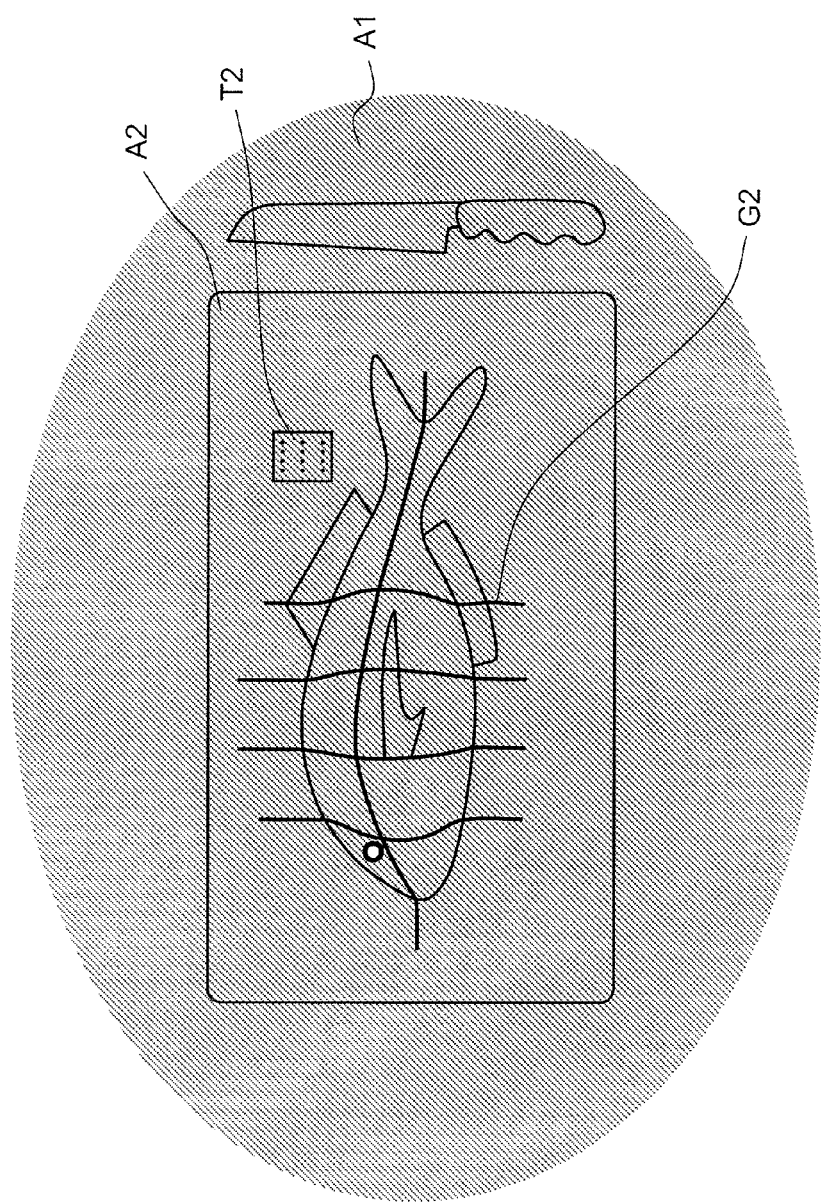
FIG. 15 is an explanatory diagram of the case where guide lines and a text are displayed in combination.

FIG. 15 illustrates the case where guide lines and a text are combined and displayed. FIG. 15 illustrates the case of cutting fish, and guide lines G2 where fish is to be cut with a kitchen knife and text T2 explaining a procedure of cutting the fish are disposed in illumination area A1. Illumination area A1 irradiated with illumination light is set to a size which covers a cutting board on which the fish is placed.

This configuration achieves a further increase in working efficiency. Furthermore, a user can be readily informed of what is to be done for the work.

In the first to fifth exemplary embodiments, a configuration is adopted in which renderer 13 performs determination processing and thereafter automatically adjusts luminance or a color shade or both luminance and a color shade of image light (guide line, text, or button), the present disclosure is not limited to this. For example, a configuration may be adopted in which if renderer 13 determines that guide lines may not be sufficiently visible, renderer 13 notifies a user of the determination result. A configuration may be adopted in which at this time, illumination apparatuses 1A to 1E present a user one or more adjustment options (reset options), and the user makes a selection. A configuration may be adopted in which a user can arbitrarily set a parameter indicating luminance or a color shade.

A configuration does not require determination processing by renderer 13. Even in this case, according to the above first to fifth exemplary embodiments, a function of changing a luminance value and a color shade of image light is provided (adjuster 15 of illumination apparatuses 1A, 1C, and 1E), and thus a user can adjust image light so as to make the image light sufficiently visible.

Although the first to fourth exemplary embodiments have described the case where preset image light (guide line and/or text) or image light input by a user is projected, the present disclosure is not limited to this. A configuration may be adopted in which image light being projected can be changed arbitrarily. Specifically, a configuration may be adopted in which the following, for instance, can be arbitrarily performed: change of a start point and an end point of a guide line; addition and deletion of a guide line; and addition and deletion of a text.

In the fifth exemplary embodiment, a configuration may be adopted in which a button which is not used can be deleted, and a guide line or a text can be added, changed and deleted, for instance.

In the first to fourth exemplary embodiments, in the case of plural guide lines or texts, luminance, a color shade, and a color may be different for each of the guide lines and texts. According to a procedure of work or a priority of work, luminance and a color shade may be set. Alternatively, the work may be separated into a plurality of groups, and a color may be set for each group, for instance. Furthermore, one of luminance, a color shade, and a color may be set to be different for a guide line and a text.

Although the third and fourth exemplary embodiments have described, as an example, the case where a guide line or a text is input using a remote controller with a gyroscope as pointing device 50 of an operation terminal, the present disclosure is not limited to this.

A configuration may be adopted in which, for example, an image of a certain pen is captured using an imaging device, and image recognition is performed on the tip of the pen, thereby detecting a trajectory of positions of the tip of the pen. In this case, illumination apparatuses 1C and 1D set a guide line or text, based on the trajectory of positions of the tip of the pen. A configuration may be adopted in which both a guide line and a text can be detected.

Alternatively, a configuration may be adopted in which a guide line and/or a text are/is input, using the ultrasonic pulse echo technique. When using the ultrasonic pulse echo technique, an ultrasonic source, a pen, and three receiving apparatuses are used. Ultrasonic waves output from the ultrasonic source reflect off the pen. The three receiving apparatuses receive the reflected ultrasonic waves, thus measuring the distances from the receiving apparatuses to the pen. This allows illumination apparatuses 1A to 1E to detect a trajectory of positions of the pen. A configuration may be adopted in which both a guide line and a text can be detected also in this case.

It should be noted that in the above embodiments, each of the constituent elements (illumination control device 10) may be constituted by dedicated hardware, or may be achieved by executing a software program suitable for the constituent element. Each constituent element may be achieved by a program execution unit such as a CPU or a processor reading and executing a software program stored in a recording medium such as a hard disk or semiconductor memory.

Although the above describes illumination apparatuses according to one or more aspects, based on the embodiments, the present disclosure is not limited to the embodiments. Various modifications to the exemplary embodiments which may be conceived by those skilled in the art and combinations of constituent elements in different exemplary embodiments may be included within the one or more aspects, without departing from the spirit of the present invention.

What is claimed is:

1. An illumination apparatus comprising:
   an illumination light controller which sets illumination light for illuminating an illumination area, the illumination light having at least one light characteristic based on at least one of a space or an object type;
   an image light controller which sets image light for projecting a projection image which includes at least one of a graphic or a character, the image light being different from the illumination light in at least one of luminance or color; and
   a light projector which irradiates the illumination area with the illumination light set by the illumination light controller, and projects the image light set by the image light controller onto the illumination area; and
   a display output which receives a setting of the illumination light from the illumination light controller, and outputs image data for displaying an image indicating the illumination area,
   wherein the image light controller receives positional information in relation to the image data, and sets the projection image, based on the positional information, wherein the image light controller sets, as the projection image, one or more lines projected onto the object, based on the positional information, and wherein when a difference in luminance between the illumination light and the image light is less than or equal to a first predetermined value and when a difference in color shade between the illumination light and the image light is less than or equal to a second predetermined value, the luminance and the color shade of the image light are adjusted.

2. An illumination apparatus comprising:

an illumination light controller which sets illumination light for illuminating an illumination area, the illumination light having at least one light characteristic based on at least one of a space or an object type;

an image light controller which sets image light for projecting a projection image which includes at least one of a graphic or a character, the image light being different from the illumination light in at least one of luminance or color; and a light projector which irradiates the illumination area with the illumination light set by the illumination light controller, and projects the image light set by the image light controller onto the illumination area; and a display output which receives a setting of the illumination light from the illumination light controller, and outputs image data for displaying an image indicating the illumination area, wherein the image light controller receives positional information in relation to the image data, and sets the projection image, based on the positional information, wherein the image light controller sets, as the projection image, one or more lines projected onto the object, based on the positional information, and wherein when a difference in luminance between the illumination light and the image light is less than or equal to a first predetermined value and when a difference in color shade between the illumination light and the image light is less than or equal to a second predetermined value, one of the luminance or the color shade of the image light are adjusted based upon which of the difference in luminance and the difference in color shade is less.

3. An illumination apparatus comprising:

an illumination light controller which sets illumination light for illuminating an illumination area, the illumination light having at least one light characteristic based on at least one of a space or an object type;

an image light controller which sets image light for projecting a projection image which includes at least one of a graphic or a character, the image light being different from the illumination light in at least one of luminance or color; and a light projector which irradiates the illumination area with the illumination light set by the illumination light controller, and projects the image light set by the image light controller onto the illumination area; and a display output which receives a setting of the illumination light from the illumination light controller, and outputs image data for displaying an image indicating the illumination area, wherein the image light controller receives positional information in relation to the image data, and sets the projection image, based on the positional information, wherein when a difference in luminance between the illumination light and the image light is less than or equal to a first predetermined value and when a difference in color shade between the illumination light and the image light is less than or equal to a second predetermined value, the luminance and the color shade of the image light are adjusted.

* * * * *